(12) United States Patent
Petrucci et al.

(10) Patent No.: US 9,804,751 B2
(45) Date of Patent: Oct. 31, 2017

(54) CREATING AND MERGING TWO-DIMENSIONAL FLOOR PLANS WITHIN THREE-DIMENSIONAL MODELS

(71) Applicant: Applied Software Technology, Inc., Atlanta, GA (US)

(72) Inventors: Mark Petrucci, Atlanta, GA (US); Xiao Chun Yao, Atlanta, GA (US)

(73) Assignee: Applied Software Technology, Inc., Atlanta, GA (US)

( * ) Notice: Subject to any disclaimer, the term of this patent is extended or adjusted under 35 U.S.C. 154(b) by 0 days.

(21) Appl. No.: 14/970,524

(22) Filed: Dec. 15, 2015

(65) Prior Publication Data

US 2017/0032581 A1 Feb. 2, 2017

Related U.S. Application Data

(60) Provisional application No. 62/197,202, filed on Jul. 27, 2015.

(51) Int. Cl.
| | |
|---|---|
| *G06T 17/00* | (2006.01) |
| *G06F 3/0484* | (2013.01) |
| *G06T 11/20* | (2006.01) |
| *G06T 15/00* | (2011.01) |
| *G06T 7/30* | (2017.01) |
| *G06T 19/00* | (2011.01) |

(52) U.S. Cl.
CPC ............ *G06F 3/0484* (2013.01); *G06T 7/30* (2017.01); *G06T 11/203* (2013.01); *G06T 15/00* (2013.01); *G06T 19/00* (2013.01); *G06T 2207/20221* (2013.01)

(58) Field of Classification Search
CPC .................. G06T 2210/04; G06F 3/04815
USPC ................................... 345/420; 703/1
See application file for complete search history.

(56) References Cited

U.S. PATENT DOCUMENTS

| | | | | |
|---|---|---|---|---|
| 2003/0004693 | A1* | 1/2003 | Neiman | G06T 19/00 703/1 |
| 2009/0105994 | A1* | 4/2009 | Mandolini | G06Q 50/16 703/1 |
| 2014/0119674 | A1* | 5/2014 | Das | G01C 21/206 382/284 |
| 2015/0063683 | A1* | 3/2015 | Fu | G06K 9/00201 382/154 |

\* cited by examiner

*Primary Examiner* — Thomas Lett
(74) *Attorney, Agent, or Firm* — Clayton, McKay & Bailey, PC (57) ABSTRACT

Systems and methods presented herein can allow a user to efficiently generate a merged two-dimensional (2D) and three-dimensional (3D) view of an existing three-dimensional construction model. A processor can create new 2D views for each floor in the 3D model, and then merge those new 2D views with new 3D views of the model. The merged views can allow a construction worker to easily alternate between two-dimensional and three-dimensional views of a construction jobsite, for example, to track information particular to a floor without having to alter the 3D model.

20 Claims, 6 Drawing Sheets

CREATING AND MERGING TWO-DIMENSIONAL FLOOR PLANS WITHIN THREE-DIMENSIONAL MODELS

CROSS REFERENCE TO RELATED APPLICATIONS

This non-provisional patent application claims the benefit of priority to provisional application No. 62/197,202 ("CREATING TWO-DIMENSIONAL FLOOR PLANS WITHIN THREE-DIMENSIONAL MODELS"), filed Jul. 27, 2015, which is hereby incorporated by reference in its entirety.

BACKGROUND

Advanced construction modeling software such as AUTODESK REVIT allows users to create three-dimensional models called Building Information Models (BIM) for use in construction documentation. REVIT can be used as an authoring tool by designers for designing buildings. Using other software, construction teams can review the model at the construction site, such as on a mobile device. The visualization provided by the models may allow users to streamline job site inspections, job site workflow, coordination, and reporting of field performance.

However, three-dimensional construction models also include technical limitations that can limit their usefulness. For example, in a multi-floor building, it is difficult to visualize only a floor plan for a particular floor within the model. A user may need to adjust the view angle, and turn off multiple layers of information before a floor plan is viewable, and even then it will contain distracting and unnecessary artifacts.

Current technology to view a floor plan within a three-dimensional model includes several technology-specific problems. For example, AUTODESK BIM 360 GLUE can interpret a three-dimensional model to reveal a two-dimensional floor, but the presentation is difficult to view and does not appear as a 2D line drawing. Instead, it is simply the same polygons as the three dimensional model, complete with textures such as carpet that are distracting and irrelevant to a contractor working on infrastructure elements of the plan. Important construction elements, such as points in a wall, may be hidden by the three-dimensional polygons or textures.

If a contractor wishes to eliminate unneeded polygons, textures, or other elements to see the type of line drawing they are familiar with, they currently must heavily manipulate the three-dimensional model (e.g., BIM file). This is time consuming, requires specialized software knowledge, and can cause the three-dimensional model to be permanently altered. Thus, a designer or other worker may no longer be able to easily view the other aspects of the three-dimensional model that were manually modified and/or removed.

Additionally, altering the 3D model into a useable 2D line drawing is currently not possible on a tablet, because of processing power restraints. Even if the contractor's tablet were powerful enough to run the associated authoring tool and make the conversion, the contractor might inadvertently eliminate architectural details that they would prefer to have left in the 3D model or 2D line drawing.

Additionally, working with more than one floor plan (e.g., the entire building) at a time can be a further drain on performance of the computing device (e.g., tablet) when the contractor is trying to access details of a particular floor. Applying filters to control visibility by floor is difficult and cumbersome, leading to frustration for the construction team.

Therefore, based on at least these technology-specific problems, a need exists for improved construction site modeling systems that can present two-dimensional line drawings for each floor in an existing three-dimensional model.

SUMMARY

The inventions described herein specifically address problems that arise in the technological context of modeling and authoring tools for construction projects. Currently, model authoring tools, such as AUTODESK REVIT, allow designers to create three-dimensional models of a building. Construction teams may use the model in the field as a guide in the construction process. But the technology does not allow for seamlessly switching to a two-dimensional line drawing of a particular floor.

Systems described herein utilize an existing three-dimensional (3D) BIM file to create floor-specific two-dimensional (2D) line drawings that are linked to related floor-specific three-dimensional (3D) models. This can allow construction teams to perform layout, quality control, and as-built functions using a less processor-intensive 3D model or more efficient 2D line drawing. In addition, a system can split a 3D multi-floor building into individual 3D floor views for improved system performance and improved user experience. A 3D floor view can include objects from the floor to the ceiling of a level in the 3D multi-floor building. An object can include polygons and other graphics that define a surface, fixture, or other building accessory. A user can then toggle between 3D models and 2D line drawings with reduced performance overhead and without having to destructively edit the original three-dimensional model.

One example system comprises a processor that executes instructions to perform stages including receiving a 3D model, determining the floors and ceilings in the 3D model, and creating new 2D views of specific floors or ceilings. The new 2D views can be grouped together by a family type.

For each new 2D view, the system can set a view range that limits the view to just the respective floor or ceiling. The system can further set a view filter for each 2D view, removing inconsequential objects from the 2D views. The system can further set visibility graphic overrides for objects in each 2D view. For example, the lines can be set to black and shading can be removed. The scale can also be set for the 2D models to correct sizing and reduce detail. In one embodiment, the system utilizes a 2D template to set the view range, view filter, visibility graphic overrides, and scale of each 2D view. This can allow the floors to have a uniform appearance in terms of styling.

Next, the system can create a new 3D view of the entire building from the existing 3D model. The system can apply similar view filters, visibility graphic overrides, and scale factors utilized for the 2D views. In one example, the system can utilize a 3D template to set these factors.

The system can then duplicate the new 3D building view so that the number of 3D views is the same as the number of 2D views in the 2D family (e.g., the floor plan or reflected ceiling plan family). Each new 3D view can be floor-specific. The system can then link the 2D views and 3D views. The 2D views can be aligned to match the elevation of the corresponding floors and ceilings in the 3D view.

This can result in a merged model that includes a linked 3D view and a 2D view for each floor. The contractor can open the merged model for the corresponding floor, and easily switch between a 3D and 2D (e.g., line) view by clicking a button in the modeling system or separate GUI.

It is to be understood that both the foregoing general description and the following detailed description are exemplary and explanatory only and are not restrictive of the embodiments, as claimed.

BRIEF DESCRIPTION OF THE DRAWINGS

The accompanying drawings, which are incorporated in and constitute a part of this disclosure, illustrate various embodiments and aspects of the present invention. In the drawings.

DESCRIPTION OF THE EMBODIMENTS

Reference will now be made in detail to the present exemplary embodiments, including examples illustrated in the accompanying drawings. Wherever possible, the same reference numbers will be used throughout the drawings to refer to the same or like parts. The described embodiments are all exemplary and non-limiting.

Exemplary systems herein allow a user to convert a 3D model of a building or building components used for a construction jobsite to a merged model (e.g., linked 2D and 3D model) that provides advantages for analyzing a particular floor. A construction jobsite system includes software for storing and viewing construction plans, changes to the plans, task lists related to the plans, visualizations, and other construction-related records. However, construction jobsite systems are currently limited to the tools actually provided as part of those systems, and visualizing a 2D floor space within a 3D model is cumbersome, processor intensive, and difficult to do without specialized user training.

A system described herein can include a conversion application that can communicate with an authoring tool's application program interface (API). In one example, a wrapper executes on the authoring tool that may include a plurality of procedure calls that are then translated to API calls recognized by the authoring tool. For example, the authoring tool API can be limited to HTTP URL calls with Javascript return values, but the wrapper can simplify numerous such calls into a single procedure call and format the data for better use.

The system may also execute an application that converts a 3D model built in the authoring tool to a more usable merged model (i.e., linked 3D and 2D model). The application can communicate with the wrapper or implement the API calls itself to perform the stages involved in converting the model.

Figure 1:
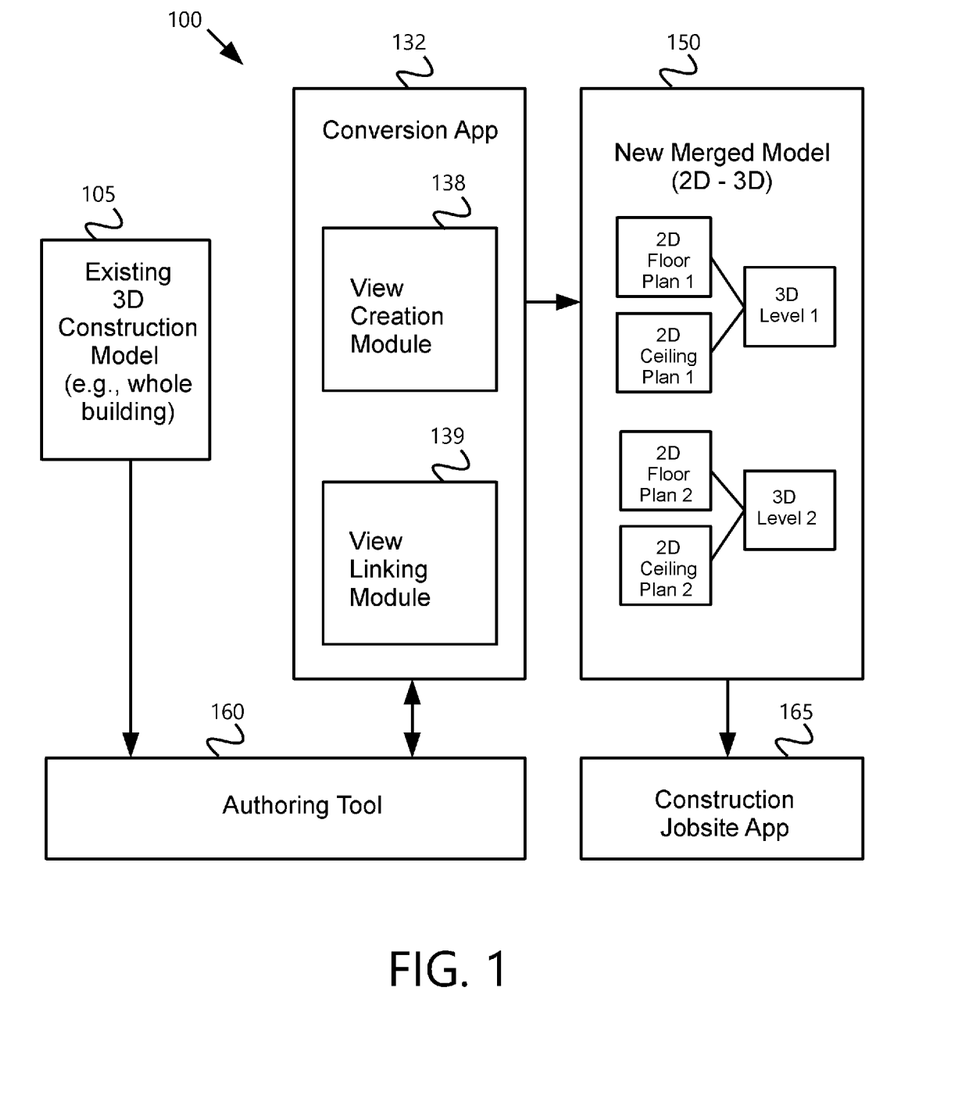
FIG. 1 is an exemplary illustration of system components for converting a 3D model into a merged (e.g., linked) floor-specific 2D and 3D model, in accordance with an embodiment.

FIG. 1 includes an exemplary diagram of a system 100 in accordance with an embodiment. The system may utilize an existing 3D construction model 105 as an input. The 3D construction model 105 may be viewable and editable in an authoring tool 160, such as REVIT.

The authoring tool 160 (e.g., construction modeling application) and existing 3D construction model 105 can execute on a computing device. The computing device can be any device that includes a processor, such as a personal computer, laptop, tablet, or cell phone.

A conversion app 132 can be used to convert the existing 3D model 105 into a new merged model 150. The merged model 150 can include a 3D level view and a 2D plan view for each level in the 3D model. A 3D floor view can include objects (e.g., polygons) that are located in a span from a floor to a ceiling of a specific level. The 2D plan view can include a 2D floor plan and/or a 2D ceiling plan. Examples herein refer to a 2D floor plan for convenience. But a 2D ceiling plan can also apply to those examples. In the merged model, a first 3D level view can correspond to a first 2D floor plan (e.g., 2D level view). The merged model can also contain a second 3D level view that corresponds to a second 2D floor plan (e.g., second 2D level view). The terms 3D level view and 3D floor view are used herein interchangeably.

The conversion app 132 can be part of the authoring tool 160 in one embodiment. In another embodiment, the conversion app 132 can be part of a construction jobsite system 160. In still another example, the conversion app 132 can execute as a stand-alone application that interfaces with the authoring tool 160.

The conversion app 132 can interface with the authoring tool 160, such as by making API calls to the authoring tool 160. Thus, the conversion app 132 can cause the construction modeling system 100 to perform various stages, such as creating new 2D and 3D views and applying various filters to those new views.

In one embodiment, the conversion app 132 includes a view creation module 138 for creating new views of the existing 3D construction model 105. The new views can include 2D plan views of each floor and/or ceiling, and a 3D level view for pairing with each 2D view. By orienting the viewpoint of the 3D level view based on the 2D view, a 3D level view of each floor can be created that shows only that floor.

The conversion app 132 can also include a view linking module 139 for linking the 2D and 3D views (e.g., the 2D plan views and the 3D level view). The view linking module 139 can also perform stages related to exporting and joining the views as a single new merged model 150 in the construction jobsite app 165. The merged model 150 can allow a construction team member (e.g., user) to toggle between 2D and 3D views and visualize each floor as line drawings, all without the processing drain associated with opening multiple models or plans at one time. The merged model 150 can also allow the user to avoid the complication of editing a 3D model 105 of an entire building when what they actually need is a line drawing of a single floor or ceiling.

Figure 2:
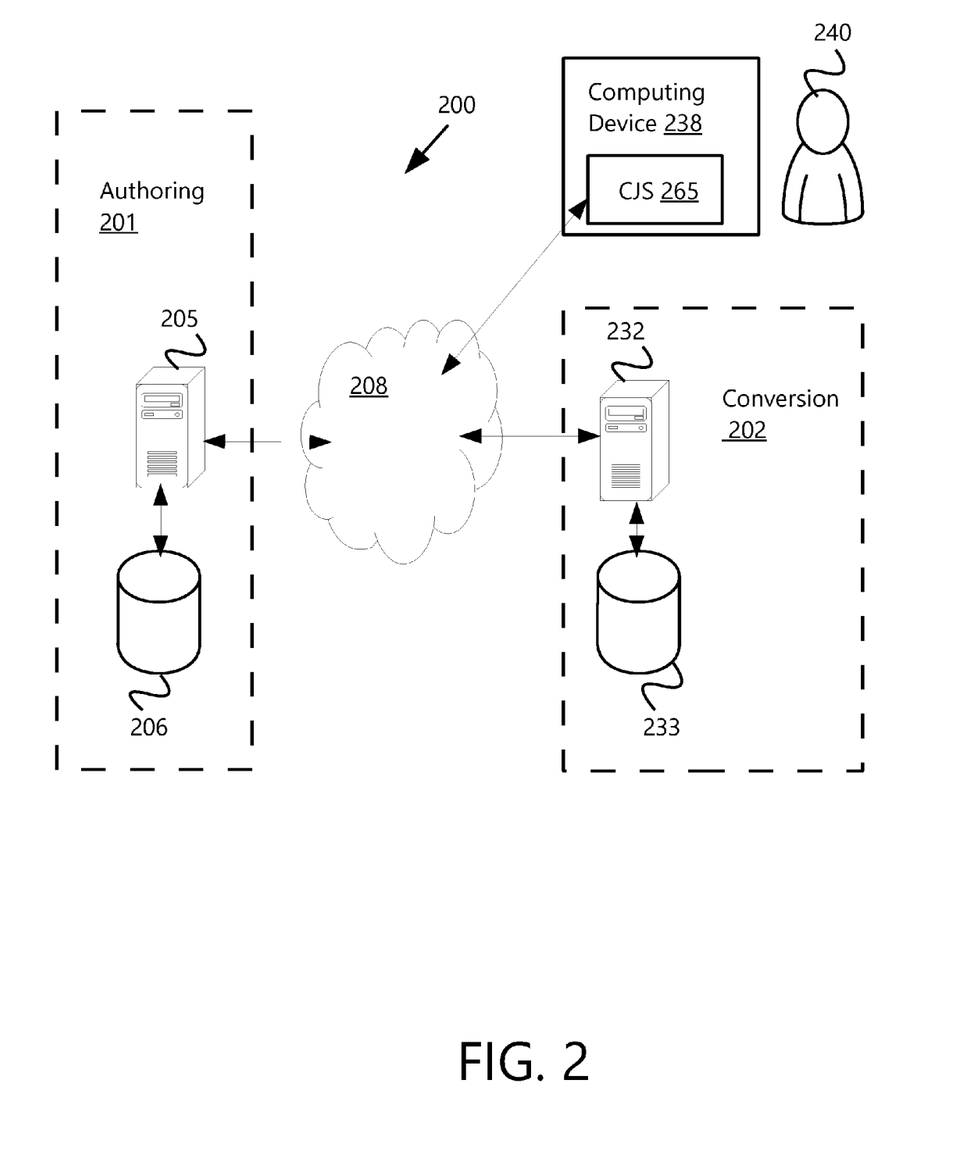
FIG. 2 is an exemplary system diagram, in accordance with an embodiment.

Turning to FIG. 2, an exemplary system 200 for converting a 3D model to a merged (e.g., linked 2D and 3D) model is illustrated.

In one embodiment, an authoring system 201 can include a server 205 and a database 206. The authoring system 201 can be accessed over a network 208, such as the Internet. The authoring system 201 can execute the authoring tool, which is accessed either locally or remotely by one or more designers (e.g., authoring users). The designers can create a 3D model of an entire building for use in the field on one or more computing devices 238 by construction team members 240.

The authoring system 201 can distribute 3D interactive building plans and models to computing devices 238 for displaying to construction team members 240. A construction jobsite app 205 can execute on the computing device 238, allowing the team member 240 to open and interact with the models. For example, the team member 240 can view the interactive building plan, make notes on the plan, update which tasks are complete, and other perform other interactive functions. The construction jobsite app 265 can then send model and task-related information to a backend server for storage and retrieval by other team members using other computing devices 238. This can allow team members 240 to organize tasks and determine what has been completed.

In one example, a conversion system 202 can include a conversion server 232 that converts the 3D models to merged models. The conversion server 232 can execute the conversion app 132, allowing the team member 240 or some other administrative user to cause 3D models to be converted into merged models that are usable at the computing device 238 with the construction jobsite app 265. The conversion server 232 can also export the merged model to the construction jobsite system 165 in one embodiment.

In another example, the conversion server 232 acts as a backend for the conversion app 132, which can execute on a user device that communicates with the conversion server 232. For example, the conversion server 232 can present a web interface on the computing device 238 that includes the graphical user interface for converting the existing 3D construction model 105 into the new merged model 150. In another embodiment, the construction management system 201 includes the construction modeling software. The conversion app 132 can execute on the conversion server 232, or alternatively, on the construction management server 205 or computing device 238.

Each illustrated server 205 and 232 can comprise one or more servers. For example, server 205 may include a plurality of servers located all over the world at locations convenient for communicating with devices in particular geographic locations. For simplicity, FIG. 2 illustrates only one server, but embodiments with multiple servers for one or more of the entities are contemplated.

The computing device 238 can be any processor-based device, such as a personal computer, laptop, tablet, or cell phone. It can also include or be part of server 232 in one example. Additionally, the computing device 238 or server 232 can execute the conversion application 132 by executing a set of instructions stored locally or remotely on a computer-readable medium.

Figure 3:
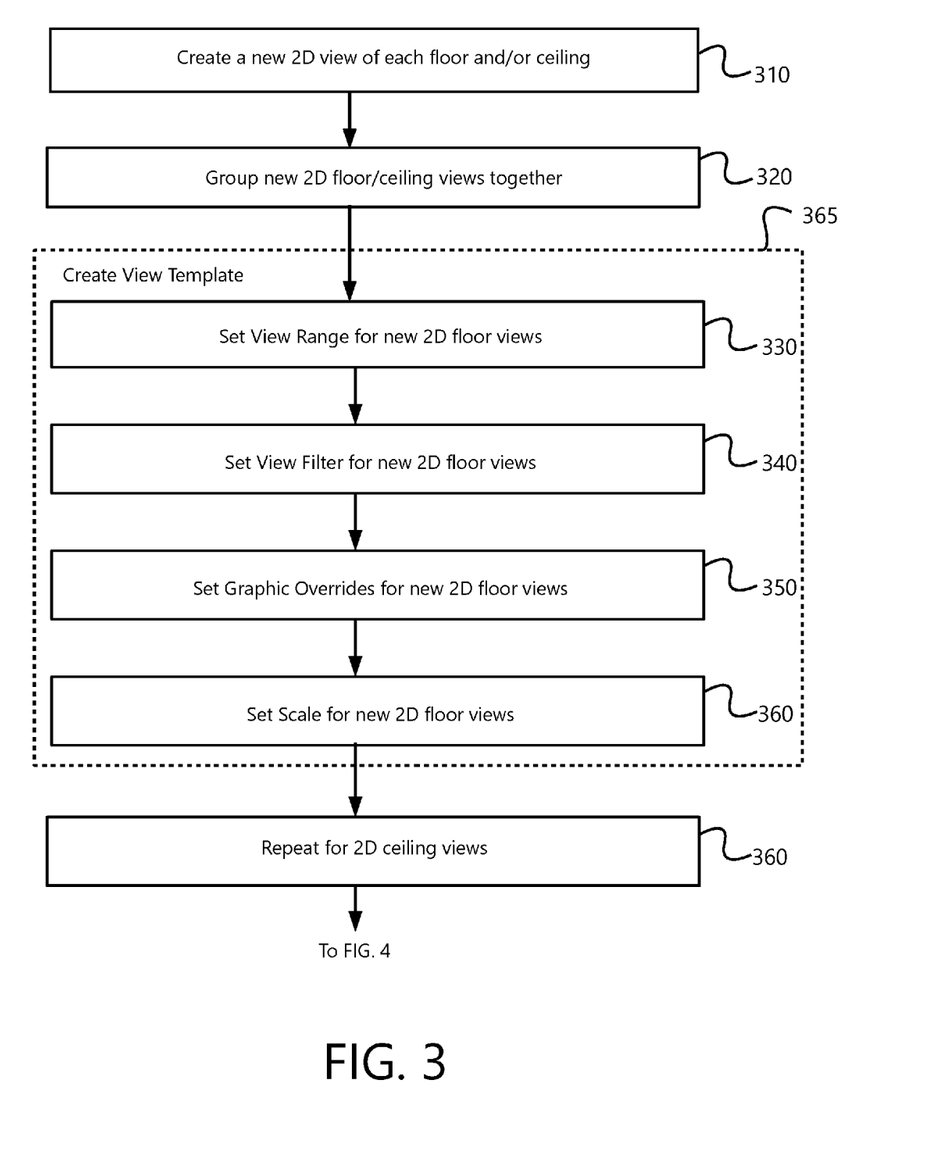
FIG. 3 is an exemplary flow chart with non-exhaustive listings of steps for creating new views of a 3D model, in accordance with an embodiment.

Turning to FIG. 3, a flow chart with exemplary steps for creating new 2D and 3D views for use in a merged model is presented. At step 310, the application can create a new 2D view of each floor in a 3D construction model 105. In one embodiment, the application detects the existing floors by detecting parallel horizontal objects (e.g., polygons) that are each greater than one or more threshold dimensions. The conversion application 132 can identify each of the parallel objects as a floor (e.g., level 1, level 2).

Floors can also be determined by identifying certain objects as associated with a floor name (e.g., level 1, level 2, etc.) that has been designated by a user. The conversion application 132 may determine that a collection of objects associated with each "level." The application can identify that collection of objects as a floor. Additionally, the ceiling objects can be included in a floor.

In still another embodiment, the conversion application 132 can prompt the user to select each floor manually. The application can display a list of names associated with different groups of objects, allowing the user to select one or more names to designate as floors. Alternatively, the user can select groups of objects by selecting polygons that represent some portion of the object(s).

Once the floors are determined though automatic analysis or user selection, the application can create new 2D views of the designated floors and ceilings. This can initially include replicating the views of objects associated with each floor from an angle looking straight down at the floor. The new 2D views can be stored in the conversion system 202 in an example.

At stage 320, the conversion application 132 can group the new 2D floor and/or ceiling views together. For example, the conversion application 132 can prompt the user to name the new 2D floor views. The user can name all the new 2D floor views differently than existing floor plan views. Additionally or alternatively, the new 2D floor views can be stored in a new floor plan folder that is separate from the floor plan folder where the original views are stored, such as "Floor Plan 2D."

In addition to creating the new 2D floor plan (e.g., line drawing) views, the conversion app 132 can also create new 2D views of ceiling plans (e.g., duct work plans). In one example, the user can be prompted to select the ceiling plans as part of the creation of the new 2D floor views. The new 2D ceiling plans can be saved in a separate folder, such as "Ceiling Plan 2D."

At stage 330, the processor can set the view range of the 2D plan views (e.g., 2D floor views and/or 2D ceiling views). The application can select the new 2D floor view (e.g., level 1), and set the view range to have a top height of the next floor (e.g., level 2). This can allow the view to include anything on the floor level and above, up to the next floor. The application can also set a cut plane elevation to four feet in one environment. This can ensure that walls that are represented in the new 2D view. For example, a wall object can start just above the floor level in the 3D model, but by extending the view range up from the floor, the wall can be captured. In one example, an object includes a series of coordinates representing shapes that are part of the object. If more than half of the coordinates are within the level, the object is included in the 3D level view in one example.

At stage 340, a view filter can be applied that removes patterns from objects in the 2D floor view. For example, surface patterns and cut patterns can be removed. This can hide shading or patterns on the objects included in the 2D floor view, so performance can be increased, and unnecessary details can be removed to improve readability and move the 2D view closer to a line drawing. The view filter can be set by a user in one example.

In another example, the conversion application 132 can detect a pattern associated with an object, and automatically set the object to not display patterns. In an example, the conversion application 132 can do this by retrieving a list of objects. The conversion application 132 can loop through the objects to detect a texture property on each object. If the texture property falls outside of a whitelist of allowable textures, the conversion application 132 can set the texture property to none or to a blank texture. In one example, the conversion application 132 can remove textures by sending one or more API calls to the authoring tool 160 to cause patterns to be disabled.

At stage 350, the conversion application 132 can set graphic overrides for the 2D floor plan views. This can allow the conversion application 132 or authoring tool to hide unnecessary categories of information, such as rooms, spaces, furniture, plants, and annotation such as tags and dimensions. Underlay layers or floors from other elevations can be removed. The graphic overrides can be set by a user in one example. In another example, the conversion application 132 can send an API call to the authorization tool to cause the one or more categories of information to be disabled.

At stage 360, a scale and detail level can be set. For example, the conversion app 132 can cause the authoring tool to reveal additional line work for a stud layer. By changing view properties, walls that show as two lines can be changed to display the stud layer by setting line detail from coarse to medium or fine. Additional line work can appear to represent studs and other structural details. Scale can be set based on the size of the project, so that the floor can fit on the screen.

Figure 5:
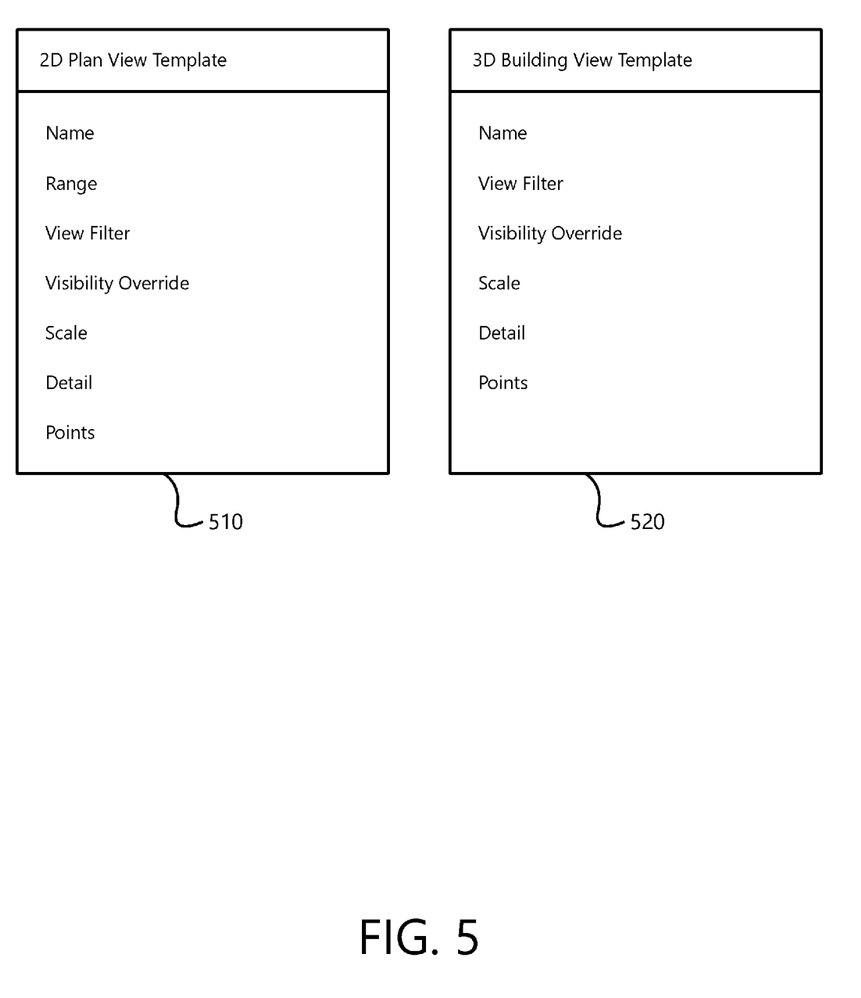
FIG. 5 is an exemplary illustration of templates, in accordance with an embodiment.

A view template can be created for setting the view range, view filter, graphic overrides, and/or scale of the 2D floor views. The conversion application 132 can apply the view template to at least partially perform steps 330, 340, 350, and 360 in an embodiment. In one embodiment, a user can manually set the view range, view filter, graphic overrides, and scale at steps 330, 340, 350, and 360. Then, based on those settings, the user can save a view template that can be used by the conversion application 132 and/or authoring tool to automatically apply the settings of steps 330, 340, 350, and 360 to other 2D floors and/or 2D ceilings. (An example 2D view template is illustrated in FIG. 5.)

The conversion application 132 can apply the view template to each level in succession so that all the new 2D floor views have a uniform architectural look.

In one example, at step 360, the application also applies one or more aspects of the view template to the ceiling views (e.g., ductwork views) in an embodiment. This can allow the application to override graphics and leave only ducting remaining in view in one embodiment. The scale detail can be set similarly to the floor views for uniformity.

The application can automatically adjust the view range of the view filter when applying the view template to the 2D ceiling views, in one embodiment. For example, the application may detect that the 2D view is a ceiling view based on name (e.g., "ceiling") or other designation. Instead of using a 4 foot view range, the range can be adjusted based on the offset of the next floor, such that the view range does not capture the objects of the next floor.

Figure 4:
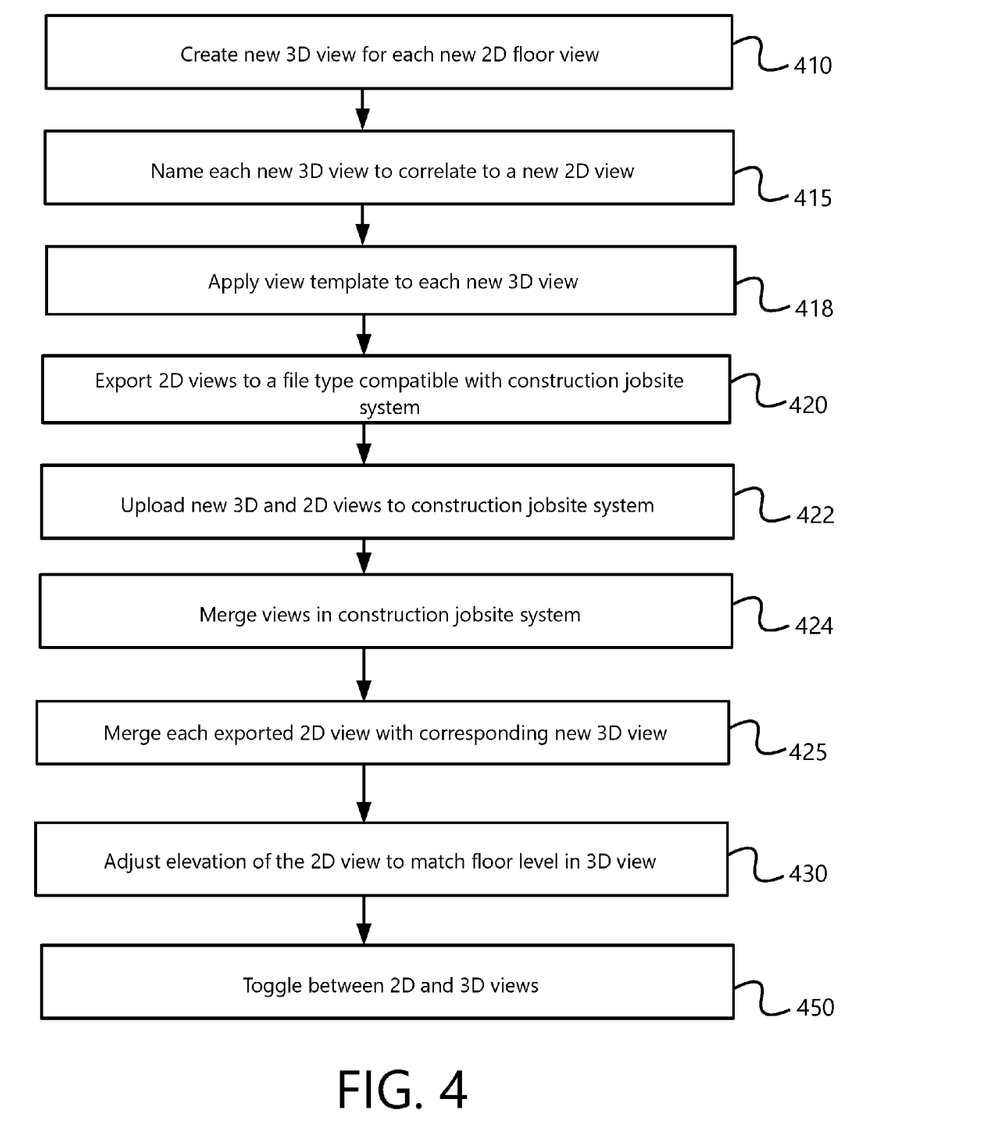
FIG. 4 is an exemplary flow chart with non-exhaustive listings of steps for merging the new views, in accordance with an embodiment.

An example method can continue as illustrated in FIG. 4. At step 410, the conversion application 132 can create a new 3D view that corresponds to each new 2D floor view. This can be done by API calls to the authoring tool to replicate the 3D model for each floor. Initially, these new 3D views can be replicas of the original 3D model (e.g., of the entire building). However, the conversion application 132 can then apply similar processing to the new 3D views.

At step 415, each new 3D view can be named to correlate to a new 2D view. The 3D views can be joined with the corresponding new 2D views (e.g., new 2D floor and new 2D ceiling).

At step 418, a view template is applied to each new 3D view. For example, the same view template created in step 365 can be applied in one embodiment. However, the application can ignore the range setting when applying the view, to ensure that the entire 3D model (e.g., building) remains part of the new 3D view. Thus, the application can apply settings related to view filter, graphic overrides, scale, and detail. In an alternate embodiment, a 3D view template is generated for applying to the new 3D views, based on differences in the above settings as compared to the original (2D) view template.

In one embodiment, the processor does not fully perform step 410 until the first new 3D view has been modified according to step 418. Once the view settings of the new 3D view has been adjusted, then the modified 3D view can be duplicated repeatedly to create a new 3D view for each new 2D floor view. Thus, all the new 3D views can have the same appearance characteristics, with the 3D view template of step 418 already applied. The 3D view template can be set to show all coordination, such as walls, within the 3D model.

Although the new 2D and 3D views are created, some file formats cannot be used by or uploaded into the construction jobsite system in one example. In other words, they cannot display in the CJS app 265. In particular, a CJS system (e.g., CJS app built 265) built for 3D views may not be able to handle the new 2D views.

Thus, at step 420, the conversion app 132 may export the new 2D plan views (floor and ceiling) to CAD drawings (.DWG) or some other format that will be recognized. However, this conversion during exporting may require additional changes to the 2D views. For example, lines may all be set to black and grids may be set to red. Units may be set to feet in one example.

Then the converted 2D plan views may be uploaded to the construction jobsite system at step 422.

At step 422, the new 3D and converted 2D plan views can be uploaded and merged into the jobsite management system 165. This can include uploading them to a jobsite management system 165 so that multiple users on the construction management team can access the models, view progress based on points in the models, and otherwise perform construction analysis based on the models. The 3D views of each level can be can be uploaded together. In one embodiment, a 3D view of the entire building is uploaded with the 3D level views.

AUTODESK GLUE is one example of software that can be utilized as part of the uploading and merging of step 422.

Once the 2D views and 3D views are uploaded, at step 424 they can be merged in the construction jobsite system. During merging, each level should stack upon the other to create the model of the entire building in the construction jobsite system. The merge function can be specific to the construction jobsite system. It can be manually selected by a user in one embodiment. In another embodiment, the application can make an API call to merge the floors selected in a graphical user interface.

At step 425, the new and/or exported 2D views can each be merged with their respective new 3D view. Additionally, the view angle and perspective of the merged 3D view can be oriented based on the merged 2D view. For level one, this can cause the 3D view to contain the filtered 3D objects for just the first level. So the new 3D view can span from the floor on level one to the bottom of the floor of level two. This can allow a user to see 3D architectural details of only one level of the building represented by the 3D model.

At step 430, the application can also allow the user to adjust the elevation or vertical offset of each 2D view. Because each 3D view is oriented to view the corresponding 2D floor view, this can allow the user to tweak what is shown in the merged 3D view. For example, the second floor 3D view may be starting just below the actual floor level of the second level. The second floor 2D view can be adjusted upwards to align with the actual floor level of the second level, causing the merged second floor 3D view to accurately show just the second level of the 3D model.

In one example, after merging, if a space exists between levels due to incorrect elevation, the application can make API calls to the authoring tool to move the levels closer together and eliminate the space. This can include calling a transform function in the jobsite management system that sets coordinates of the view.

At this point, users that are part of the construction management team can access the new merged 3D and 2D model in the construction management system. In addition, because each floor is its own view (merged into the completed model), they can be toggled on and off for easier access and visibility.

Contractors are used to looking at line drawings. Under this approach, a contractor may select the floor they are interested in. They can see the floor plan in 3D for that floor. But they can also toggle off the 3D view, leaving themselves with a line drawing view of the 2D plan. In this way, the contractor can contextualize the entire 3D model with the line drawings that they are accustomed to using in the field.

The users can then see points in the 3D model that will be reflected in the views. These points can be used for layout, quality assurance, quality control, as-built (e.g., descriptive representation of a construction or engineering project), and other tasks for attention during construction.

FIG. 5 is an exemplary illustration of templates, in accordance with an embodiment. The system can store a 2D plan view template 510 and a separate 3D building view template 520. The 2D plan view template 510 can be used for a 2D floor view or 2D ceiling view. These templates 510 and 520 can be used by the conversion application 132 to apply uniform visual adjustments to the 2D and 3D views, respectively. A 2D plan view template 510 can include a name, a range setting, a view filter setting, and a visibility override setting. It can also specify a scale for the floor to ensure each floor is shown by default in the same scale.

The 3D building view template 520 can include similar settings, except that in one example it does not include an elevation range since the building template 520 can apply to an entire building model and/or any 3D floor view.

Figure 6:
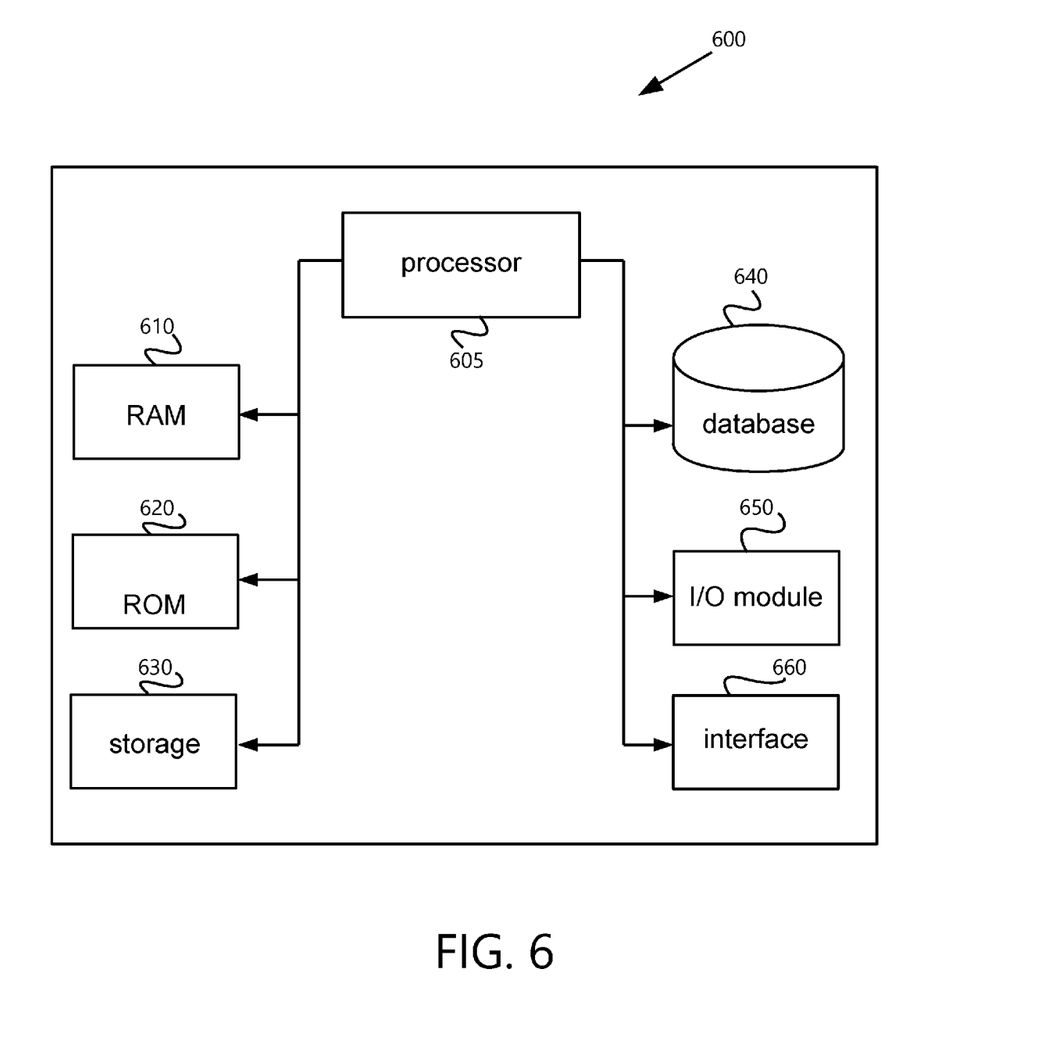
FIG. 6 is an exemplary illustration of system components, in accordance with an embodiment.

FIG. 6 depicts an exemplary processor-based computing system 600 representative of the type of computing system that may be present in or used in conjunction with a server 205, 232, or device 238 of FIG. 2. Continuing with FIG. 6, the computing system 600 is exemplary only and does not exclude the possibility of another processor- or controller-based system being used in or with one of the aforementioned components. Additionally, a server 205, 232, or a user device 238 need not include all the system hardware components in an embodiment.

In one aspect, system 600 may include one or more hardware and/or software components configured to execute software programs, such as software for storing, processing, and analyzing data. For example, system 600 may include one or more hardware components such as, for example, processor 605, a random access memory (RAM) module 310, a read-only memory (ROM) module 620, a storage system 630, a database 640, one or more input/output (I/O) modules 650, and an interface module 660. Alternatively and/or additionally, system 600 may include one or more software components such as, for example, a computer-readable medium including computer-executable instructions for performing methods consistent with certain disclosed embodiments. It is contemplated that one or more of the hardware components listed above may be implemented using software. For example, storage 630 may include a software partition associated with one or more other hardware components of system 600. System 600 may include additional, fewer, and/or different components than those listed above. It is understood that the components listed above are exemplary only and not intended to be limiting.

Processor 605 may include one or more processors, each configured to execute instructions and process data to perform one or more functions associated with system 600. The term "processor," as generally used herein, refers to any logic processing unit, such as one or more central processing units (CPUs), digital signal processors (DSPs), application specific integrated circuits (ASICs), field programmable gate arrays (FPGAs), and similar devices. As illustrated in FIG. 6, processor 605 may be communicatively coupled to RAM 610, ROM 620, storage 630, database 640, I/O module 650, and interface module 660. Processor 605 may be configured to execute sequences of computer program instructions to perform various processes, which will be described in detail below. The computer program instructions may be loaded into RAM for execution by processor 605.

RAM 610 and ROM 620 may each include one or more devices for storing information associated with an operation of system 600 and/or processor 605. For example, ROM 620 may include a memory device configured to access and store information associated with system 600, including information for identifying, initializing, and monitoring the operation of one or more components and subsystems of system 600. RAM 610 may include a memory device for storing data associated with one or more operations of processor 605. For example, ROM 620 may load instructions into RAM 610 for execution by processor 605.

Storage 630 may include any type of storage device configured to store information that processor 605 may need to perform processes consistent with the disclosed embodiments.

Database 640 may include one or more software and/or hardware components that cooperate to store, organize, sort, filter, and/or arrange data used by system 600 and/or processor 605. For example, database 640 may include user-specific account information, including password information as it relates to shared media content. Alternatively, database 640 may store additional and/or different information. Database 640 may also contain a plurality of databases that are communicatively coupled to one another and/or processor 605, which may be one of a plurality of processors utilized by server 630.

I/O module 650 may include one or more components configured to communicate information with a user associated with system 600. For example, I/O module 650 may include a console with an integrated keyboard and mouse to allow a user to input parameters associated with system 600. I/O module 650 may also include a display including a graphical user interface (GUI) for outputting information on a monitor. I/O module 650 may also include peripheral devices such as, for example, a printer for printing information associated with system 600, a user-accessible disk drive (e.g., a USB port, a floppy, CD-ROM, or DVD-ROM drive, etc.) to allow a user to input data stored on a portable media device, a microphone, a speaker system, or any other suitable type of interface device.

Interface 660 may include one or more components configured to transmit and receive data via a communication network, such as the Internet, a local area network, a workstation peer-to-peer network, a direct link network, a wireless network, or any other suitable communication platform. For example, interface 660 may include one or more modulators, demodulators, multiplexers, demultiplexers, network communication devices, wireless devices, antennas, modems, and any other type of device configured to enable data communication via a communication network.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for creating a merged two-dimensional (2D) and three-dimensional (3D) model from a 3D construction model, the system comprising:
   a non-transitory computer-readable medium containing instructions;
   a processor in communication with the computer-readable medium, the processor performing stages including:
      determining a plurality of floors in the 3D construction model;
      creating a new 2D floor view for each floor in the 3D construction model;
      grouping the new 2D floor views together;
      setting, for each new 2D floor view, a view range, a view filter, a graphic override, and a scale;
      creating a new 3D floor view of the 3D construction model for each new 2D floor view;
      naming each new 3D floor view to correspond to its respective new 2D floor view; and
      merging each new 2D floor view with its respective new 3D floor view, such that the 3D floor view is of the corresponding floor and the 2D floor view is a line drawing.

2. The system of claim 1, wherein the stages performed by the processor further include:
   storing in a first template the view range, the view filter, the graphic override, and the scale; and
   utilizing the first template in setting, for at least one of the new 2D floor views, the view range, the view filter, the graphic override, and the scale.

3. The system of claim 1, wherein creating the new 3D floor view of the 3D construction model for each new 2D floor view includes setting a view filter, a graphic override, and a scale of the new 3D floor view.

4. The system of claim 3, wherein the stages performed by the processor further include utilizing a second template in setting, for at least one of the new 3D floor views, the view filter, the graphic override, and the scale.

5. The system of claim 1, wherein the stages performed by the processor further include exporting the new 2D floor views to a different file type compatible with a construction jobsite system.

6. The system of claim 1, wherein the stages performed by the processor further include adjusting the elevation of a new 2D floor view to align with a floor in a new 3D floor view.

7. The system of claim 1, wherein the stages performed by the processor further include graphically displaying a button to toggle between a merged 2D floor view and the respective merged 3D floor view.

8. A non-transitory computer-readable medium containing instructions for creating linked two-dimensional (2D) and three-dimensional (3D) views of a 3D construction model, the instructions causing a processor to execute stages including:
   determining a plurality of floors in the 3D construction model;
   creating a new 2D floor view for each floor in the 3D construction model;
   grouping the new 2D floor views together;
   setting, for each new 2D floor view, a view range, a view filter, a graphic override, and a scale;
   creating a new 3D floor view of the 3D construction model for each new 2D floor view;
   naming each new 3D floor view to correspond to its respective new 2D floor view; and
   merging each new 2D floor view with its respective new 3D floor view, such that the 3D floor view is of the corresponding floor and the 2D floor view is a line drawing.

9. The non-transitory computer-readable medium of claim 8, wherein the stages performed by the processor further include:
   storing in a first template the view range, the view filter, the graphic override, and the scale; and
   utilizing the first template in setting, for at least one of the new 2D floor views, the view range, the view filter, the graphic override, and the scale.

10. The non-transitory computer-readable medium of claim 8, wherein creating the new 3D floor view of the 3D construction model for each new 2D floor view includes setting a view filter, a graphic override, and a scale of the new 3D floor view.

11. The non-transitory computer-readable medium of claim 10, wherein the stages performed by the processor further include utilizing a second template in setting, for at least one of the new 3D floor views, the view filter, the graphic override, and the scale.

12. The non-transitory computer-readable medium of claim 8, wherein the stages performed by the processor further include exporting the new 2D floor views to a different file type compatible with a construction jobsite system.

13. The non-transitory computer-readable medium of claim 8, wherein the stages performed by the processor further include adjusting the elevation of a new 2D floor view to align with a floor in a new 3D floor view.

14. The non-transitory computer-readable medium of claim 8, wherein the stages performed by the processor further include graphically displaying a button to toggle between a first merged 2D floor view and the respective merged 3D floor view.

15. A computer-implemented method including:
   determining a plurality of floors in the 3D construction model;
   creating a new 2D floor view for each floor in the 3D construction model;
   grouping the new 2D floor views together;
   setting, for each new 2D floor view, a view range, a view filter, a graphic override, and a scale;
   creating a new 3D floor view of the 3D construction model for each new 2D floor view;
   naming each new 3D floor view to correspond to its respective new 2D floor view; and
   merging each new 2D floor view with its respective new 3D floor view, such that the 3D floor view is of the corresponding floor and the 2D floor view is a line drawing.

16. The computer-implemented method of claim 15, further including:
   storing in a first template the view range, the view filter, the graphic override, and the scale; and utilizing the first template in setting, for at least one of the new 2D floor views, the view range, the view filter, the graphic override, and the scale.

17. The computer-implemented method of claim 15, wherein creating the new 3D floor view of the 3D construction model for each new 2D floor view includes setting a view filter, a graphic override, and a scale of the new 3D floor view.

18. The computer-implemented method of claim 17, further including utilizing a second template in setting, for at least one of the new 3D floor views, the view filter, the graphic override, and the scale.

19. The computer-implemented method of claim 15, further including exporting the new 2D floor views to a different file type compatible with a construction jobsite system.

20. The computer-implemented method of claim 15, further including adjusting the elevation of a new 2D floor view to align with a floor in a new 3D floor view.

* * * * *